United States Patent
Beaurepaire et al.

(10) Patent No.: US 12,276,518 B2
(45) Date of Patent: Apr. 15, 2025

(54) APPARATUS AND METHODS FOR PROVIDING ROUTES FOR VEHICLES USING SPARE TIRES

(71) Applicant: HERE GLOBAL B.V., Eindhoven (NL)

(72) Inventors: Jerome Beaurepaire, Courbevoie (FR); Leon Stenneth, Chicago, IL (US); Jeremy Michael Young, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 198 days.

(21) Appl. No.: 18/085,357

(22) Filed: Dec. 20, 2022

(65) Prior Publication Data

US 2024/0200968 A1 Jun. 20, 2024

(51) Int. Cl.
*G01C 21/36* (2006.01)
*G01C 21/34* (2006.01)
*G06N 20/00* (2019.01)

(52) U.S. Cl.
CPC ..... *G01C 21/3691* (2013.01); *G01C 21/3461* (2013.01); *G06N 20/00* (2019.01)

(58) Field of Classification Search
CPC . G06N 20/00; G01C 21/3461; G01C 21/3691
See application file for complete search history.

(56) References Cited

U.S. PATENT DOCUMENTS

| | | | | |
|---|---|---|---|---|
| 10,818,042 | B1* | 10/2020 | Tang | G06T 7/73 |
| 10,832,400 | B1* | 11/2020 | Tang | G06T 7/001 |
| 2012/0316731 | A1 | 12/2012 | Harrison et al. | |
| 2017/0253243 | A1* | 9/2017 | Dudar | B60W 30/18009 |
| 2019/0196471 | A1* | 6/2019 | Vaughn | G06N 3/04 |
| 2021/0118244 | A1* | 4/2021 | Natarajan | G07C 5/006 |
| 2021/0118305 | A1* | 4/2021 | Natarajan | G08G 1/202 |

FOREIGN PATENT DOCUMENTS

| | | |
|---|---|---|
| CN | 111196212 A | 5/2020 |
| DE | 102018130535 A1 | 6/2020 |

OTHER PUBLICATIONS

Hansen, et al., "Enhanced Detection of Minispare Usage," Department of Automatic Control (2021) http:/lup.lub.lu.se/student-papers/record/9059740.

* cited by examiner

*Primary Examiner* — Tyler J Lee
(74) *Attorney, Agent, or Firm* — Peter H. Yu; HERE GLOBAL B.V.

(57) ABSTRACT

An apparatus, method and computer program product are provided for predicting tire temperature levels. In one example, the apparatus receives input data indicating attributes of the target vehicle and attributes of target routes for the target vehicle. The apparatus causes a machine learning model to generate output data as a function of the input data, where the output data indicate a subset of the target routes of which the target vehicle can successfully traverse while using the at least one spare tire. The machine learning model is trained to generate the output data as a function of the input data based on training data, where the training data indicate events in which vehicles used spare tires to traverse routes. The training data indicate attributes of the vehicles and attributes of the routes.

20 Claims, 10 Drawing Sheets

FIG. 7

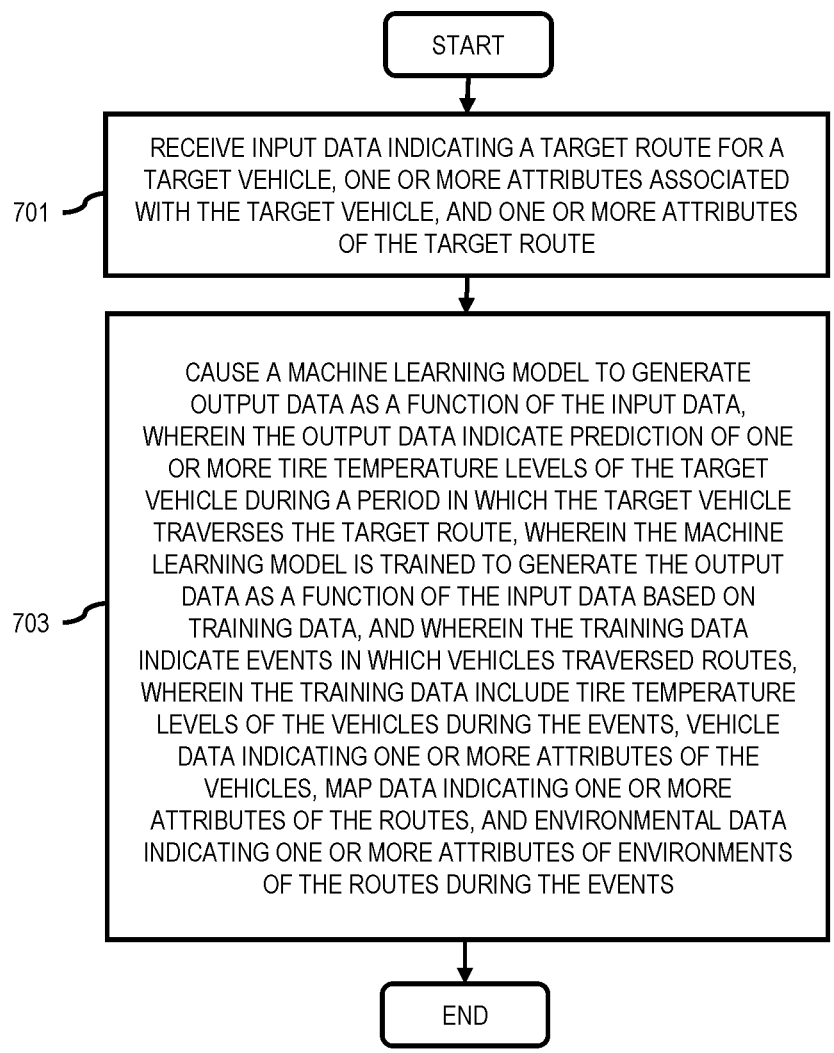

700

START

701 — RECEIVE INPUT DATA INDICATING A TARGET ROUTE FOR A TARGET VEHICLE, ONE OR MORE ATTRIBUTES ASSOCIATED WITH THE TARGET VEHICLE, AND ONE OR MORE ATTRIBUTES OF THE TARGET ROUTE

703 — CAUSE A MACHINE LEARNING MODEL TO GENERATE OUTPUT DATA AS A FUNCTION OF THE INPUT DATA, WHEREIN THE OUTPUT DATA INDICATE PREDICTION OF ONE OR MORE TIRE TEMPERATURE LEVELS OF THE TARGET VEHICLE DURING A PERIOD IN WHICH THE TARGET VEHICLE TRAVERSES THE TARGET ROUTE, WHEREIN THE MACHINE LEARNING MODEL IS TRAINED TO GENERATE THE OUTPUT DATA AS A FUNCTION OF THE INPUT DATA BASED ON TRAINING DATA, AND WHEREIN THE TRAINING DATA INDICATE EVENTS IN WHICH VEHICLES TRAVERSED ROUTES, WHEREIN THE TRAINING DATA INCLUDE TIRE TEMPERATURE LEVELS OF THE VEHICLES DURING THE EVENTS, VEHICLE DATA INDICATING ONE OR MORE ATTRIBUTES OF THE VEHICLES, MAP DATA INDICATING ONE OR MORE ATTRIBUTES OF THE ROUTES, AND ENVIRONMENTAL DATA INDICATING ONE OR MORE ATTRIBUTES OF ENVIRONMENTS OF THE ROUTES DURING THE EVENTS

END

APPARATUS AND METHODS FOR PROVIDING ROUTES FOR VEHICLES USING SPARE TIRES

TECHNICAL FIELD

The present disclosure generally relates to the field of vehicle routing systems, associated methods and apparatus, and in particular, concerns, for example, an apparatus configured to provide route guidance and assistance for vehicles using spare tires based on attributes of the vehicles and routes.

BACKGROUND

Vehicles are equipped with spare tires for use in an emergency situation in which a tire is damaged and cannot be further used. Typically, spare tires are smaller in size relative to regular tires and tires can be readily stored in storage compartments within the vehicles. As vehicle design choices favour larger interior spaces for occupants and loads, spare tires and storage compartments designated for storing said tires are increasingly manufactured to be compact. Additionally, vehicle manufacturers design spare tires with the intention that the spare tires will be used for a limited amount of distance. As such, spare tires are typically thin and lack proper tread patterns, and vehicles using spare tires are impacted by decreased traction and control. Further, since spare tires are designed to be stored for a long period of time without requiring routine maintenance, spare tires typically lack air-filled cushions, and physical impact received at the spare tires may directly transmit to the wheels. As such, suspensions of vehicles using spare tires are highly susceptible stress when the vehicles traverse uneven terrains or degraded road conditions. Therefore, there is a need in the art that provides route guidance for vehicles using spare tires based on limitations of the spare tires and attributes of routes.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: receive training data indicating events in which vehicles used spare tires to traverse routes, the training data indicating attributes of the vehicles and attributes of the routes; and using the training data, train a machine learning model to generate output data as a function of input data, wherein the input data indicate attributes of a target vehicle using at least one spare tire and attributes of target routes for the target vehicle, and wherein the output data indicate a subset of the target routes of which the target vehicle can successfully traverse while using the at least one spare tire.

In various embodiments, the attributes of the vehicles indicate: (i) vehicle specifications; (ii) an amount of load exerted on each of the vehicles; (iii) a weight distribution of each of the vehicles; (iv) specifications of spare tires and non-spare tires; (v) a number of spare tires used by each of the vehicles; (vi) one or more positions of one or more of the spare tires used by each of the vehicles; (vii) tire pressure levels; (viii) tire temperature levels; or (ix) a combination thereof.

In various embodiments, the attributes of the routes indicate, for each road segment or node of each of the routes: (i) a road surface type; (ii) a road surface condition; (iii) a functional class; (iv) a curvature; (v) a degree of traffic; (vi) a weather condition impacting said road segment or node; (vii) one or more traffic rules; or (viii) a combination thereof.

In various embodiments, the training data include maneuver data indicating maneuvers executed by the vehicles during the events, and wherein the output data indicate vehicle maneuver instructions for maneuvering the target vehicle on each of the subset.

According to a second aspect, a non-transitory computer-readable storage medium having computer program code instructions stored therein is described. The computer program code instructions, when executed by at least one processor, cause the at least one processor to: receive input data indicating attributes of a target vehicle using at least one spare tire and attributes of target routes for the target vehicle; and cause a machine learning model to generate output data as a function of the input data, wherein the output data indicate a subset of the target routes of which the target vehicle can successfully traverse while using the at least one spare tire, wherein the machine learning model is trained to generate the output data as a function of the input data based on training data, and wherein the training data indicate events in which vehicles used spare tires to traverse routes, the training data indicating attributes of the vehicles and attributes of the routes.

In various embodiments, the computer program code instructions, when executed by the at least one processor, cause the at least one processor to determine the target routes based on locations of points-of-interest (POIs) designated for providing vehicle-related services.

In various embodiments, the input data is first input, the output data is first output data, and the subset is a first subset. The computer program code instructions, when executed by the at least one processor, cause the at least one processor to: alter one or more of the attributes of the target vehicle; cause the machine learning model to generate second output data as a function of second input data, the second input data indicating the one or more altered attributes of the target vehicle, wherein the second output data indicate a second subset of the target routes of which the target vehicle can successfully traverse while using the at least one spare tire; and generate a recommendation to be provided at a user equipment, wherein the recommendation indicate the one or more altered attributes of the target vehicle and the second subset.

In various embodiments, the one or more altered attributes include: (i) an amount of load exerted on the target vehicle; (iii) a weight distribution of the target vehicle; (iv) a number of spare tires used by the target vehicle; (v) one or more positions of one or more of the spare tires used by the target vehicle; (vii) one or more tire pressure levels of one or more tires of the target vehicle; or (viii) a combination thereof.

In various embodiments, the input data is first input, the output data is first output data, and the subset is a first subset. One or more of the attributes of the target routes indicates conditions of the target routes at one or more first time instances. The computer program code instructions, when executed by the at least one processor, cause the at least one processor to: receive prediction data indicating predicted changes in the one or more of the attributes of the target routes; based on the prediction data, alter the one or more of the attributes of the target routes to indicate the conditions of the target routes at one or more second time instances following the one or more first time instances; cause the machine learning model to generate second output data as a function of second input data, the second input data indicating the one or more altered attributes of the target vehicle, wherein the second output data indicate a second subset of the target routes of which the target vehicle can successfully traverse while using the at least one spare tire; calculate one or more departure times for the target vehicle to begin traversing each of the subset based on the one or more second time instances; and generate a recommendation to be provided at a user equipment, wherein the recommendation indicate the one or more departure times.

In various embodiments, the prediction data are weather forecast data, and the one or more of the attributes of the target routes is weather conditions of the target routes.

According to a third aspect, a method of providing route recommendations for a target vehicle using at least one spare tire is described. The method includes: receiving input data indicating attributes of the target vehicle and attributes of target routes for the target vehicle; and causing a machine learning model to generate output data as a function of the input data, wherein the output data indicate a subset of the target routes of which the target vehicle can successfully traverse while using the at least one spare tire, wherein the machine learning model is trained to generate the output data as a function of the input data based on training data, and wherein the training data indicate events in which vehicles used spare tires to traverse routes, the training data indicating attributes of the vehicles and attributes of the routes.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 7 illustrates a flowchart of a process for providing routes for vehicles using spare tires;

DETAILED DESCRIPTION

As discussed above, spare tires are typically thinner than regular tires and lack proper tread patterns and cushions. As such, when vehicles equipped with spare tires encounter road conditions inducing low coefficient of friction or road segments with high curvature, the likelihood in which the vehicles lose traction and slip is increased. Additionally, since spare tires lack cushions and directly transmit physical impact to suspensions, the suspension may be severely damaged if vehicles traverse uneven terrains or degraded road segments (e.g., roads including pot holes, bumps, cracks, etc.). Further, location of a wheel that is being replaced with a spare tire may also impact maneuverability of a vehicle. For example, if one of a front wheel of a vehicle is replaced with a spare tire, a driver of the vehicle must carefully make turns since traction of the spare tire is decreased in comparison to a regular tire.

Embodiments described herein provide a system that trains a machine learning model for providing routes for vehicles using spare tires based on attributes of the vehicles and the routes. The system includes an assessment platform, where the assessment platform receives training data indicating events in which vehicles used spare tires to traverse routes. The training data indicate attributes of the vehicles and attributes of the routes. The assessment platform uses the training data to train a machine learning model to generate output data as a function of input data, where the input data indicate attributes of a target vehicle using at least one spare tire and attributes of target routes for the target vehicle, and the output data indicate a subset of the target routes of which the target vehicle can successfully traverse while using the at least one spare tire. Once the machine learning model is trained, the assessment platform causes the machine learning model to generate output data as a function of the input data. In one embodiment, the attributes of the vehicles indicate: (i) vehicle specifications; (ii) an amount of load exerted on each of the vehicles; (iii) a weight distribution of each of the vehicles; (iv) specifications of spare tires and non-spare tires; (v) a number of spare tires used by each of the vehicles; (vi) one or more positions of one or more of the spare tires used by each of the vehicles;

(vii) tire pressure levels; (viii) tire temperature levels; or (ix) a combination thereof. In one embodiment, the attributes of the routes indicate, for each road segment or node of each of the routes: (i) a road surface type; (ii) a road surface condition; (iii) a functional class; (iv) a curvature; (v) a degree of traffic; (vi) a weather condition impacting said road segment or node; (vii) one or more traffic rules; or (viii) a combination thereof. Details of such embodiments will be described further herein.

Figure 1:
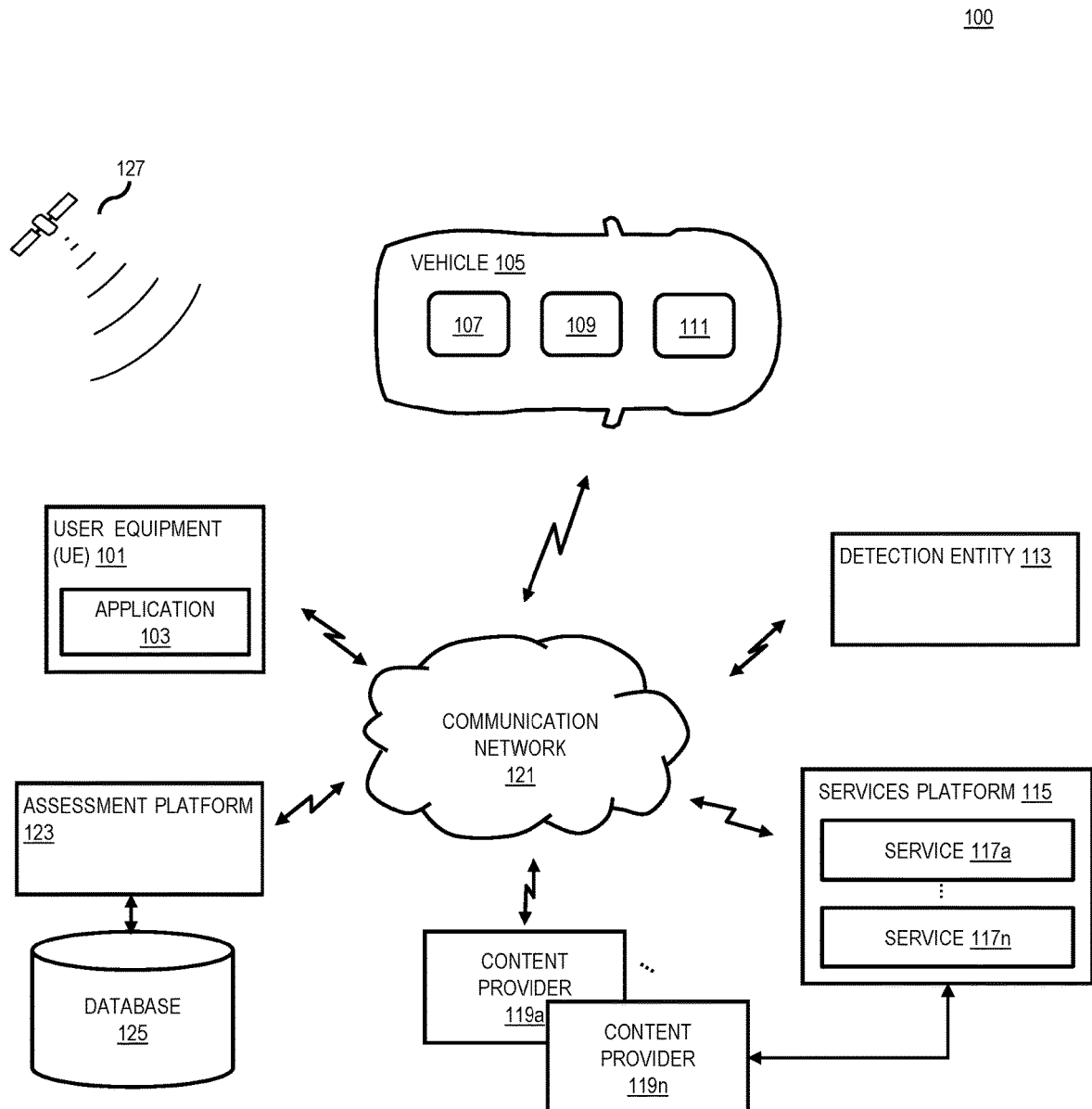
FIG. 1 illustrates a diagram of a system capable of providing routes for vehicles using spare tires.

FIG. 1 is a diagram of a system 100 capable of providing routes for vehicles using spare tires, according to one embodiment. Herein, a spare tire should be construed as an additional tire or wheel carried by a vehicle as a replacement for one of a tire of the vehicle that goes flat, has a blow out, or has another emergency. A spare tire may be a "space-saver" or a "donut" type tire that is not meant to be used by a vehicle for traversing long distances. The system includes a user equipment (UE) 101, a vehicle 105, a detection entity 113, a services platform 115, content providers 119a-119n, a communication network 121, an assessment platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the assessment platform 123 via the communication network 121. The assessment platform 123 performs one or more functions associated with providing routes for vehicles using spare tires. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the assessment platform 123 and perform one or more functions associated with the functions of the assessment platform 123 by interacting with the assessment platform 123 over the communication network 121. In one embodiment, the application 103 may be used convey information regarding: (1) detection of one or more wheels of the vehicle 105 being replace with one or more spare tires; (2) limitations of the one or more spare tires; and (3) one or more routes of which the vehicle 105 can traverse while using the one or more spare tires.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In one embodiment, the vehicle 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the vehicle 105 along a path of travel, etc. In one embodiment, the sensors 107 may include sensors for detecting an event in which a wheel of the vehicle 105 is replaced with a spare tire. Such sensors may include one or more image sensors, suspension sensors, wheel sensors, gyroscopes, or a combination thereof. In a further embodiment, one or more of the sensors 107 about the perimeter of the vehicle 105 may detect the relative distance of the vehicle 105 from stationary objects (e.g., construct, wall, etc.), road objects, lanes, or roadways, the presence of other vehicles, pedestrians, traffic lights, road features (e.g., curves) and any other objects, or a combination thereof. Said sensors 107 may also detect orientations of such objects. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11 ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the assessment platform 123, the UE 101, the services platform 115, one or more of the content providers 119a-119n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be another vehicle, a drone, a user equipment, or a roadside sensor. The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In one embodiment, the detection entity 113 may include tire temperature sensors and tire pressure sensors. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the assessment platform 123 and/or other components within the system 100. Similar to vehicle 105, the detection entity 113 may also include sensors for detecting an event in which a wheel of a vehicle is replaced with a spare tire.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the assessment platform 123, the database 125, or other entities communicatively coupled to the communication network 121 through the service platform 115. In one embodiment, the services platform 115 uses the output data generated by of the assessment platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the assessment platform 123, or the combination thereof. In one embodiment, the content provided may be any type of content, such as map content, textual content, audio content, video content, image content, etc. In one embodiment, the content providers 119 may provide content that may aid in providing routes for vehicles using spare tires, and/or other related characteristics. In one embodiment, the content providers 119 may also store content associated with the UE 101, the vehicle 105, services platform 115, the assessment platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 123 may be a platform with multiple interconnected components. The assessment platform 123 may include multiple servers, intelligent networking devices, computing devices, components and corresponding software for providing routes for vehicles using spare tires. It should be appreciated that that the assessment platform 123 may be a separate entity of the system 100, included within the UE 101 (e.g., as part of the applications 103), included within the vehicle 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), or a combination thereof.

The assessment platform 123 is capable of: (1) acquiring training data indicating events in which vehicles used spare tires to traverse routes, the training data indicating attributes of the vehicles and attributes of the routes; (2) using the training data, training a machine learning model to generate output data as a function of input data, where the input data indicate attributes of a target vehicle using at least one spare tire and attributes of target routes for the target vehicle, and the output data indicate a subset of the target routes of which the target vehicle can successfully traverse while using the at least one spare tire; and (3) causing the trained machine learning model to generate output data as a function of the input data.

The assessment platform 123 may acquire training data from vehicles (e.g., detection entities 113) that used spare tires to traverse routes. The training data may also be acquired from non-vehicle types of entities, such as stationary roadside sensors, drones, etc. The training data include attributes of vehicles that used spare tires to traverse routes and attributes of the routes. In one embodiment, the attributes of the vehicles indicate: (1) vehicle specifications; (2) an amount of load exerted on each of the vehicles; (3) a weight distribution of each of the vehicles; (4) specifications of spare tires and non-spare tires; (5) a number of spare tires used by each of the vehicles; (6) one or more positions of one or more of the spare tires used by each of the vehicles; (7) tire pressure levels; (8) tire temperature levels; or (9) a combination thereof. The vehicle specifications may indicate engine technical data (e.g., fuel type, engine position, engine size, number of valves, horsepower, torque, drivetrain, etc.), fuel consumption data (e.g., fuel tank capacity, range, fuel consumption, etc.), size, dimensions, aerodynamics, and weight. The amount of load exerted on each of the vehicle and the weight distribution of said vehicle may be acquired by sensors equipped by the vehicles (e.g., suspension sensors, axle load sensors, load cell sensors, etc.). The tire specification may indicate a vehicle type associated with a tire, dimensions, aspect ratio, construction, rim diameter, load index, speed rating, flotation sizing, tire quality grading, etc. The number of spare tires used by each of the vehicles and the one or more positions of one or more of the spare tires used by said vehicle may be determined by sensors equipped by the vehicles. Such sensors may be one or more image sensors that captures images of an event in which a spare tire is installed, suspensions sensors indicating readings corresponding to a condition in which a vehicle is using a spare tire (e.g., angle of the vehicle), or other types of sensors for detecting installation of a spare tire.

The one or more attributes of the routes indicates, for each road segment or node of each of the routes: (1) a road surface type; (2) a road surface condition; (3) a functional class; (4) a curvature; (5) a degree of traffic; (6) one or more traffic rules; (7) a weather condition impacting said road segment or node; or (8) a combination thereof. The road surface type may indicate the composition of the road surface of each of the routes (e.g., asphalt, concrete, dirt, etc.). The road surface condition may indicate the condition of the road surface for each of the routes (e.g., formation of potholes, cracks, etc.). A functional class of a road defines a function of the road within a transportation system. In one embodiment, a functional class of a road may be described as a numerical value (e.g., 1, 2, 3, 4, and 5). Functional class 1 may be interstates while functional class 5 may be local roads. One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road. An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads. The curvature may indicate a curvature of a portion of each of the routes (e.g., a road segment, multiple road segment, or a portion of a road segment). The degree of traffic may be indicative of traffic at a portion of the route in which the vehicle was traversing at a given instance. The degree of traffic may indicate a current traffic condition for said portion or a historical traffic condition at said portion for a given instance. The weather conditions may indicate: (1) air temperature levels; (2) humidity levels; (3) pavement temperature levels; (4) precipitation; (5) solar radiation levels; (6) wind direction and intensity levels; or (7) a combination thereof. The air temperature levels, humidity levels, precipitation, solar radiation levels, and wind direction and intensity levels may indicate variables of environments local to all portions of each of the routes and during instances in which a corresponding vehicle among the vehicles was traversing each portion of said route. The precipitation of each of the routes may indicate: (1) a type of precipitation formed within one or more portions of said route; (2) an amount of precipitation formed within one or more portions of said route; (3) an amount of precipitation that was forming within one or more portion of said route at one or more periods; (4) a location of precipitation formed within said route; or (5) a combination thereof. In one embodiment, the training data may also indicate whether a vehicle using a spare tire has successfully traversed (i.e., traversed the entire route without requiring any vehicle-related services) or unsuccessfully traversed (i.e., the vehicle did not traverse the entire route or required vehicle-related services to completely traverse the route) a route designated for the vehicle. In such embodiment, the route may be an original route designated for the vehicle prior to an event in which the vehicle used the spare tire or a new route designated for the vehicle after the event. In one embodiment, for each event in which a vehicle using a spare tire has unsuccessfully traversed a route, the training data indicate one or more reasons explaining why the vehicle has unsuccessfully traversed the route and a portion of the route in which the vehicle has stopped moving.

In one embodiment, the training data include maneuver data indicating maneuvers executed by the vehicles on the routes during the events. Specifically, the maneuver data may indicate, for each vehicle that traversed a route: (1) an average speed of the vehicle for one or more portions of the route; (2) acceleration/deceleration rates of the vehicle for one or more portions of the route; (3) lane-to-lane maneuver patterns; (4) steering angles of the vehicle for one or more portions of the route; or (5) a combination thereof.

The machine learning model receives the training data and transforms the training data into machine-readable and generalizable vectors. The machine learning model renders context around the training data such that commonalities can be detected. Once the machine learning model translates the training data into a vector format suitable to be used as a feature vector for machine learning, the assessment platform 123 trains the machine learning model on resulting pairs (i.e., observations as seen in the training data and desired output value). For example, a desired output value may be defined by a subset of routes for a vehicle using a spare tire for a given instances of time, and observations may be defined by aggregating all occurrences of past events in which vehicles used spare tires were recorded on a particular road segment during a particular setting (e.g., all occurrences having the same vector representation). In one embodiment, the machine learning model may incorporate supervised machine learning techniques. In one embodiment, the machine learning model may incorporate a standard regression or classification task.

Once the machine learning model is trained, the machine learning model may receive input data indicating attributes of a target vehicle using at least one spare tire and attributes of target routes for the target vehicle and use the input data to generate output data indicating prediction of a subset of the target routes of which the target vehicle can successfully traverse while using the at least one spare tire. Herein, a "target" modifier refers to an object of which the prediction is rendered for, an object/data related to the prediction, or an object/data used for rendering the prediction. For exemplary embodiments herein, the target vehicle is the vehicle 105. The input data may be provided to the assessment platform 123 from the vehicle 105, one or more detection entities 113, the services platform 115, the content providers 119, the database 125, or a combination thereof. Certain attributes of the target routes may be acquired by one or more detection entities 113 that are currently within the target routes or was within the target routes during one or more past periods (i.e., before the machine learning model uses the input data to render the output data). In one embodiment, the subset of the target routes may correspond to past events in which vehicles using spare tires successfully traversed routes, where the attributes of the vehicles and the routes are similar to the attributes of the target vehicle and the subset of the target routes. In one embodiment, the assessment platform 123 may cause the machine learning model to generate the output data in response to determining that the target vehicle has recently installed a spare tire for use. In such embodiment, the assessment platform 123 communicates with the target vehicle and receives sensor data indicating that the target vehicle is using a spare tire. For example, suspension sensors equipped by a target vehicle may acquire sensor data indicating usage of a spare tire and transmit the sensor data to the assessment platform 123. In one embodiment, the assessment platform 123 may cause the machine learning model to generate the output data in response to receiving a request via the UE 101 or the vehicle 105. In one embodiment, the target routes may be user-selected routes or routes generated based on user-selected destinations. In one embodiment, the target routes may be automatically selected by the assessment platform 123 based on the current location of the target vehicle. In such embodiment, destinations of the target routes may be: (1) service-based POIs (e.g., vehicle repair shops, dealerships, etc.); (2) residences of occupants of the target vehicle; (3) other types of POIs; or (4) a combination thereof.

In one embodiment, the output data may indicate additional information associated with each of the subset. For example, such information may include one or more vehicle maneuver instructions for a driver of the target vehicle to successfully maneuver the target vehicle through said subset. In such example, a vehicle maneuver instruction may indicate a speed limit for a given road segment of a target route, a lane-level guidance, a maximum amount of acceleration/deceleration rate, a recommended range of vehicle steering angles, etc. By way of another example, the additional information may indicate, for each target route in which the target vehicle is predicted to unsuccessfully traverse, one or more reasons as to why the target vehicle will not be able to traverse said target route. In another example, the additional information may indicate an estimated-time-of-arrival (ETA) for each of the subset, where the ETA is calculated based on one or more limitations of the target vehicle using one or more spare tires.

It is contemplated that limitations of a vehicle using a spare tire may vary based on certain attributes of the vehicle. By way of example, a vehicle using a spare tire for one of front wheels of the vehicle may have less traction and control for maneuvering the vehicle through a turn in comparison to a vehicle that is using a spare tire for one of rear wheels of the vehicle. By way of another example, if a vehicle is using a spare tire and a weight distribution of the vehicle is focused on an area in which the spare tire is installed, the maximum distance at which the vehicle can travel while using the spare tire may be reduced due to stress applied on the spare tire. As such, in one embodiment, the assessment platform 123 may: (1) identify all attributes of a target vehicle that can be readily altered by a user (e.g., location of which the spare tire is installed); (2) input the altered attributes of the target vehicle as a part of input data provided to the machine learning model; and (3) cause the machine learning model to output a subset of a plurality of target routes that can be successfully traversed by the target vehicle based on the input data. For example, the assessment platform 123 may determine that a front wheel of a target vehicle needs to be replaced by a spare tire and renders output data indicating a subset of a plurality of target routes that can be successfully traversed by the target vehicle based on the current condition of the target vehicle. To provide a user of the target vehicle with additional options, the assessment platform 123 may run a scenario in which a rear wheel of the target vehicle replaces the front wheel of the vehicle and the spare tire is installed at the original position of the rear wheel. The assessment platform 123 generates output data indicating a different subset of a plurality of target routes that can be successfully traversed by the target vehicle based on the scenario. If a user chooses one of the different subset that is not included within the original subset, the assessment platform 123 may provide instructions for the user to replace the front wheel of the vehicle with the rear wheel and install the spare tire at the original position of the rear wheel, thereby enabling the target vehicle to successfully traverse said one of the different subset. Another attribute of a target vehicle that can be readily altered by a user is weight distribution of the target vehicle (e.g., rear-ranging loads within the vehicle, seating arrangements for occupants, etc.). As such, the assessment platform 123 may run scenarios based on various weight distribution of the target vehicle and output a subset of a plurality of target routes that can be successfully traversed by the target vehicle.

In one embodiment, if output data generated by the machine learning model indicate that a load exerted on a target vehicle renders the target vehicle incapable of traversing a target route, the assessment platform 123 considers various options for reducing the load and provides suggestions indicating said options to a user of the target vehicle. By way of example, if a heavy load such as a trailer is attached to a target vehicle using a spare tire, the assessment platform 123 may consider a scenario in which the trailer is detached from the target vehicle and provide attributes associated with the target vehicle, as defined in the scenario, as input data to the machine learning model. If the output data of the machine learning model indicate that the target vehicle will be able to traverse one or more target routes without the trailer, the assessment platform 123 may provide, to a user of the target vehicle, a suggestion to detach the trailer.

In one embodiment, the assessment platform 123 considers scenarios in which a target vehicle using a spare tire maneuvers in various driving modes to output one or more target routes. For example, if the target vehicle is capable of operating various driving modes (e.g., front wheel drive, rear wheel drive, or four-wheel drive), the assessment platform 123 considers each driving mode as an attribute of the target vehicle and inputs the attribute to the machine learning model. Data output by the machine learning model for each of the driving modes may indicate one or more target routes of which the target vehicle will be able to successfully traverse if the target vehicle traverses the one or more target routes while using said driving mode.

It is contemplated that attributes of routes may change within a short interval of time. For example, such attributes may be weather conditions or a degree of traffic associated with a route. As such, in one embodiment, the assessment platform 123 may: (1) receive prediction data indicating predicted changes in one or more attributes of a target route; (2) alter one or more attributes of the target route based on the prediction data; and (3) generate output data based on the one or more altered attributes. By way of example, the assessment platform 123 may render output data indicating that a target vehicle will not be able successfully traverse a target route due to a rainy weather condition that is impacting the target route. To provide the target vehicle with additional options, the assessment platform 123 may receive weather forecast data associated with the target route and determine a future time point in which the rainy weather condition will subside based on the weather forecast data. Once the future time point is identified, the assessment platform 123 alters an attribute of the target route to indicate the weather condition that will impact the target route at the future time point. The altered attribute is provided as a part of input data for the machine learning model embodied within the assessment platform 123. In response, the machine learning model generates output data indicating whether the target vehicle will be able to successfully traverse the target route at the future time point. If the assessment platform 123 determines that the target vehicle will be able to successfully traverse the target route at the future time point, the assessment platform 123 provides the output data to a user of the target vehicle and a recommendation indicating that the user can traverse the target route at the future time point. However, if the assessment platform 123 determines that the target vehicle will not be able to successfully traverse the target route at the future time point, the assessment platform 123 repeats the process of providing alternative future time points in which the target vehicle can successfully traverse the target route.

Figure 2:
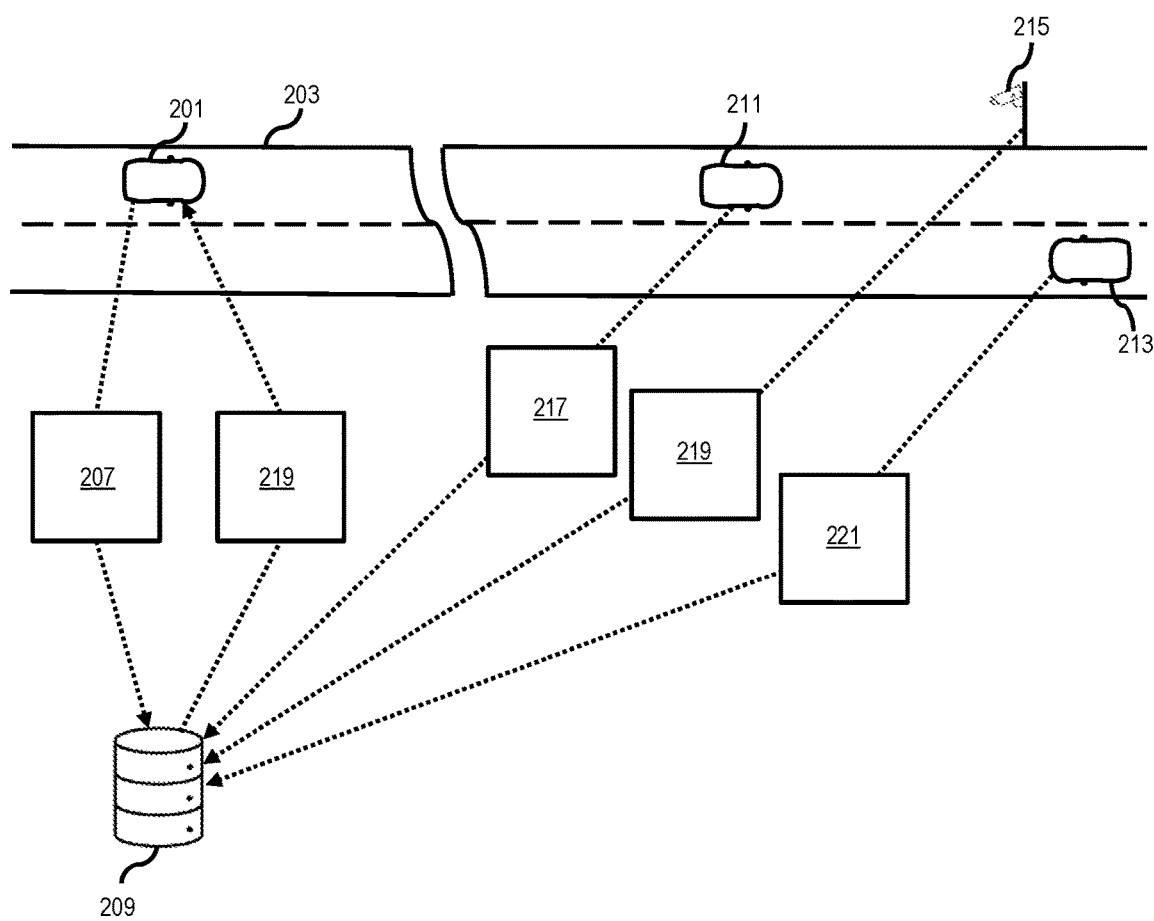
FIG. 2 illustrates an example scenario in which a machine learning model renders output data indicating whether a target vehicle can successfully traverse a target route.

FIG. 2 illustrates an example scenario 200 in which a machine learning model renders output data indicating whether a target vehicle can successfully traverse a target route. In the illustrated example, a target vehicle 201 is within a road link 203, and a tire of a target vehicle 201 has been recently replaced with a spare tire. A sensor (not illustrated) equipped by the target vehicle 201 detects the installation of the spare tire, and in response to the detection, the target vehicle 201 transmits a first data packet 207 to a server 209, where the first data packet 207 includes attributes associated with the target vehicle 201 (e.g., vehicle specifications, spare tire specifications, an amount of load exerted on the vehicle 201, a distribution of load exerted on the vehicle 201, the location of the spare tire, etc.) and a request for one or more target routes. It is assumed that the target vehicle 201 has not provided a specific destination and is relying on the server 209 to provide a suitable destination for the target vehicle (e.g., a vehicle repair shop, vehicle service center, dealership, etc.). The server 209 may be the assessment platform 123 of FIG. 1. In the illustrated example, a first vehicle 211, a second vehicle 213, and a roadside surveillance post 215 are disposed in a subsequent portion of the road link 203. Each of the first vehicle 211, the second vehicle 213, and the roadside surveillance post 215 are equipped with sensors for detecting attributes associated with the road link 203. Additionally, the first vehicle 211, the second vehicle 213, and the roadside surveillance post 215 are communicatively coupled to the server 209 and transmits a second data packet 217, a third data packet 219, and a fourth data packet 221 to the server 209, where the second data packet 217, the third data packet 219, and the fourth data packet 221 indicate the attributes associated with the road link 203 (e.g., a road surface type, a road surface condition, a weather condition impacting the road link 203, etc.). The server 209 determines a target route to a destination (not illustrated) based on the current location of the target vehicle 201 and further determines that the target route includes the road link 203. The server 209 inputs the first data packet 207, the second data packet 217, the third data packet 219, and the fourth data packet 221 to a machine learning model embodied within the server 209, and the machine learning model provides output data indicating that the target vehicle 201 can successfully traverse the target route based on the conditions of the target vehicle 201 and the road link 203. In such embodiment, it is assumed that the machine learning model has generated the output data based further on other data indicating attributes of other subsequent portions (not illustrated) of the target route. In response to rendering the output data, the server 209 provides a third data packet 219 to the vehicle 201, where the third data packet 219 includes the output data indicating that the target vehicle 201 can successfully traverse the target route including the subsequent portion of the road link 203. The output data may further indicate maneuver instructions for traversing the road link 203 (e.g., lane-level guidance, recommended speed limit, etc.).

The assessment platform 123 is capable of generating notifications and/or other types of information based on data output by the machine learning model. The assessment platform 123 may transmit the notifications to the UE 101 and/or a user interface associated with a target vehicle. In one embodiment, the assessment platform 123 may provide notifications to one or more vehicles proximate to the target vehicle to indicate that the target vehicle is using a spare tire. Alternatively, the assessment platform 123 may cause the target vehicle to provide such notifications to the one or more vehicles. The notification may include sound notification, display notification, vibration, or a combination thereof. In one embodiment, the assessment platform 123 may cause the UE 101 and/or the user interface associated with the target vehicle to generate a graphical interface indicating the output data of the machine learning model.

Figure 3:
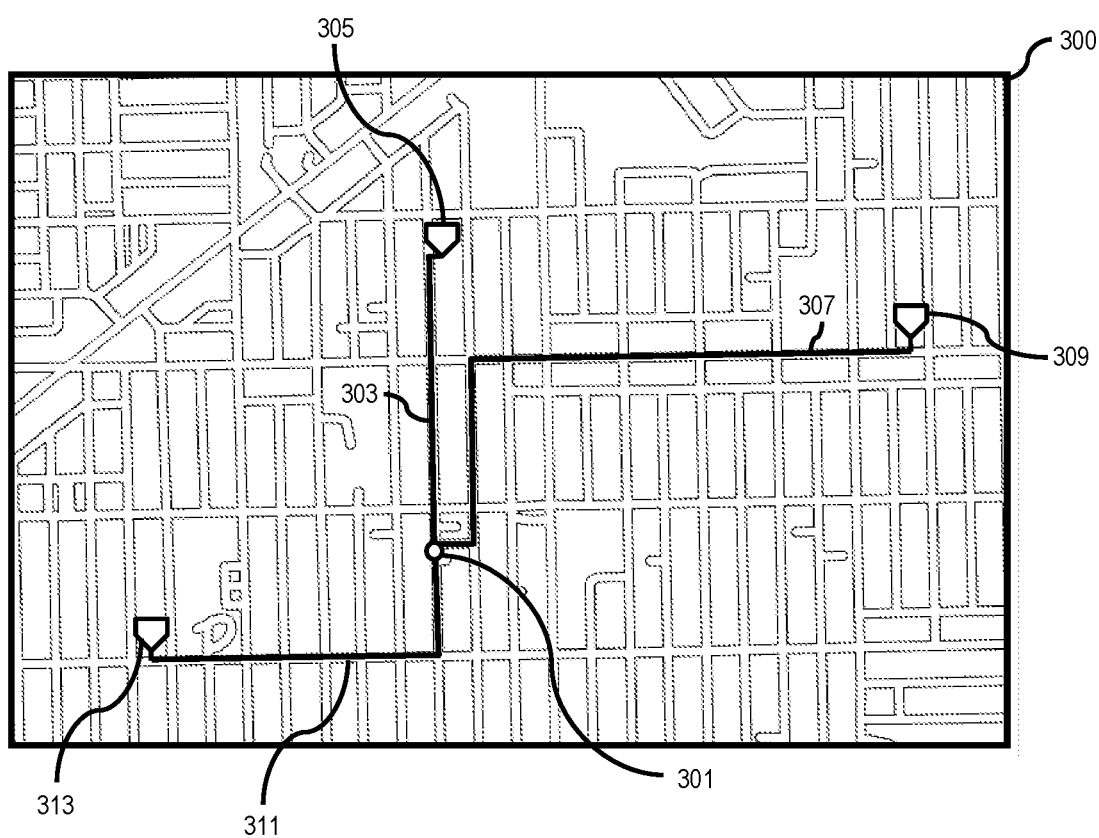
FIG. 3 illustrates an example graphical interface indicating a scenario in which a subset of a plurality of target routes for a target vehicle is selected.
Figure 4:
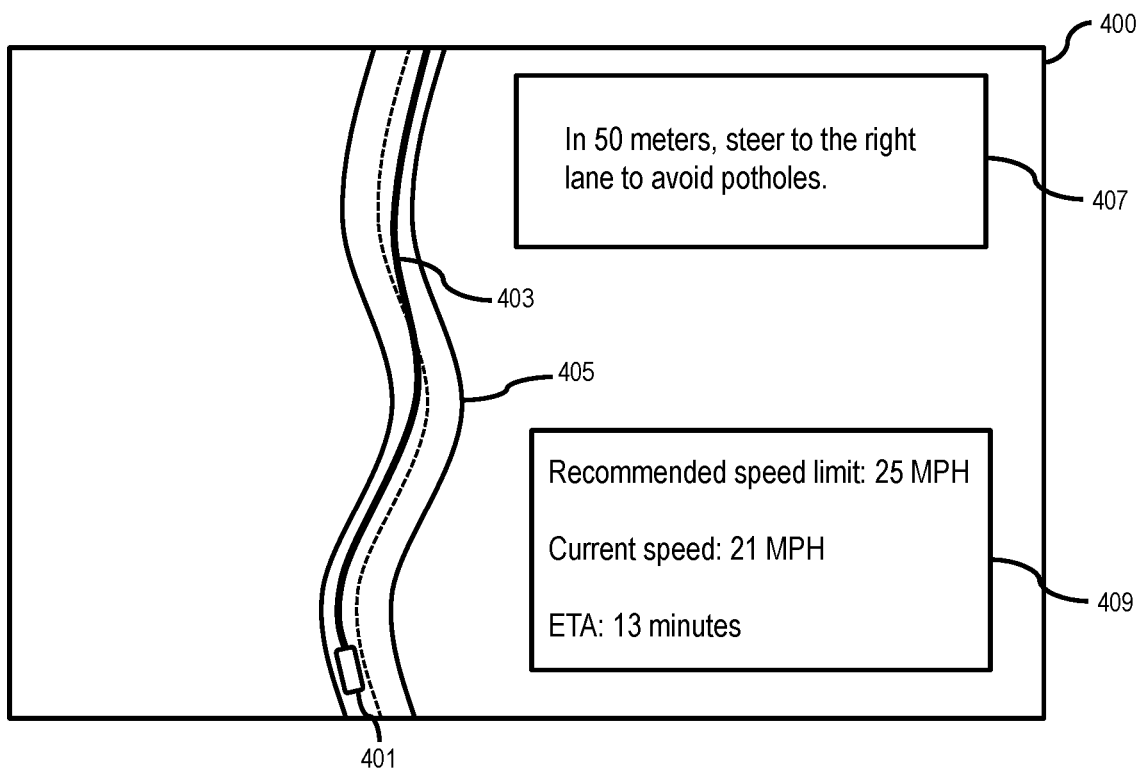
FIG. 4 illustrates another example graphical interface indicating a scenario in which a target route is selected and information associated with the target route are provided.

FIG. 3 illustrates an example graphical interface indicating a scenario in which a subset of a plurality of target routes for a target vehicle is selected. In the illustrated example, a graphical user interface 300 depicts a portion of a map and includes a location of a target vehicle 301, a first target route 303 leading to a first destination 305, a second target route 307 leading to a second destination 309, and a third target route 311 leading to a third destination 313. A trained machine learning model embodied within the assessment platform 123 received data indicating attributes associated with the first target route 303, the second target route 307, and the third target route 311 and generated output data indicating that the target vehicle 301 will be able to successfully traverse the first target route 303 and the second target route 307, but not the third target route 311. In one embodiment, the graphical user interface 300 may further provide a message prompt (not illustrated) asking a user if the user wishes to select the first target route 303 or the second target route 307. FIG. 4 illustrates another example graphical interface indicating a scenario in which a target route is selected and information associated with the target route are provided. In the illustrated example, a graphical user interface 400 includes a target vehicle 401 traversing a target route 403 on a road link 405. A trained machine learning model embodied within the assessment platform 123 received data indicating attributes associated with the target vehicle 401 and the target route 403 and generated maneuver instructions for the target vehicle 401. The graphical user interface 400 includes a first message 405 advising the driver of the target vehicle 401 to steer to the right lane to avoid oncoming potholes, thereby ensuring that the target vehicle 401 successfully traverses the target route 403. The first message 407 states "IN 50 METERS, STEER TO THE RIGHT LANE TO AVOID POTHOLE." The graphical user interface 400 includes a second message 409 including a recommended speed level for the target vehicle 401, the current speed level of the target vehicle 401, and an ETA to the destination from the current location of the target vehicle 401.

In one embodiment, the assessment platform 123 provides other various features for vehicles that are in need of spare tires. One of such features includes causing a vehicle that requires installation of a spare tire to broadcast messages to nearby vehicles, where the messages include requests for drivers or vehicle occupants of the nearby vehicles to assist the vehicle in the installation of the spare tire. In one embodiment, a request message may include an incentive for nearby vehicles to accommodate the requesting vehicle (e.g., monetary incentives, credit incentive, etc.). In one embodiment, the assessment platform 123 instructs a vehicle that needs a spare tire to wait at a designated location until assistance arrives. In one embodiment, the assessment platform 123 instructs a vehicle to wait at a designated location for a predetermined period and further instructs the vehicle to resume traversing the vehicle's route subsequent to the predetermined period.

The assessment platform 123 can be implemented in hardware, firmware, software, or a combination thereof. Though depicted as a separate entity in FIG. 1, it is contemplated that the assessment platform 123 may be implemented for direct operation by the UE 101, the vehicle 105, the services platform 115, one or more of the content providers 119, or a combination thereof. As such, the assessment platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in providing routes for vehicles using spare tires. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the assessment platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
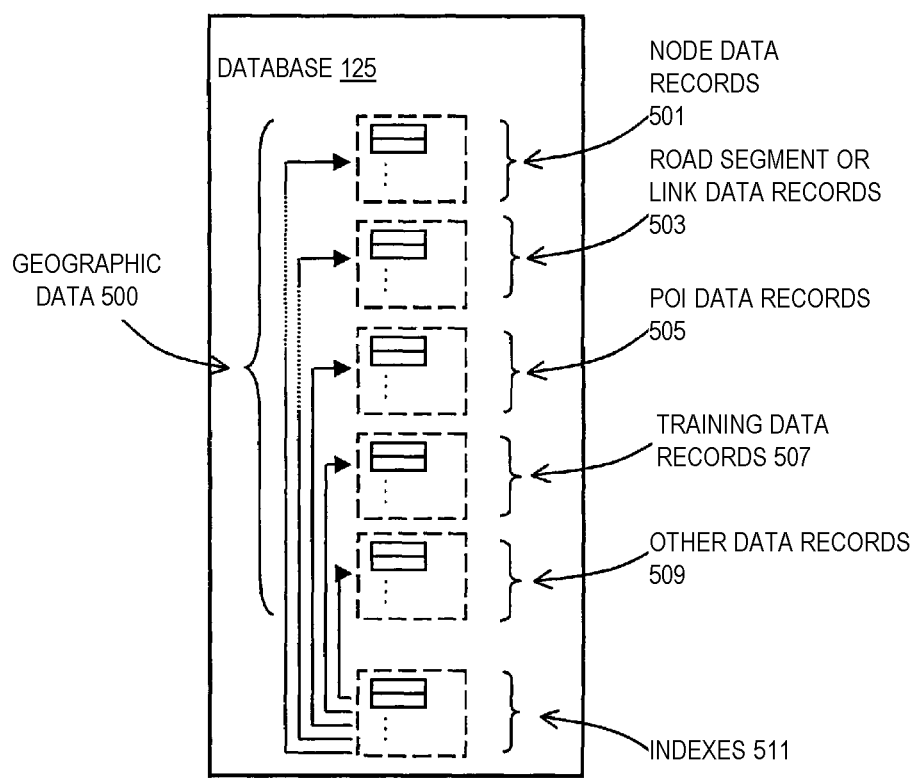
FIG. 5 illustrates a diagram of a database of FIG. 1.

FIG. 5 is a diagram of a database 125 (e.g., a map database), according to one embodiment. In one embodiment, the database 125 includes data 500 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multilevel tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 125 includes node data records 501, road segment or link data records 503, POI data records 505, training data records 507, other records 509, and indexes 511, for example. More, fewer or different data records can be provided. In one embodiment, additional data records (not shown) can include cartographic ("carto") data records, routing data, and maneuver data. In one embodiment, the indexes 511 may improve the speed of data retrieval operations in the database 125. In one embodiment, the indexes 511 may be used to quickly locate data without having to search every row in the database 125 every time it is accessed.

In exemplary embodiments, the road segment or link data records 503 are links or segments representing roads, streets, or paths, as can be used in the calculated route or recorded route information for determination of one or more personalized routes. The node data records 501 are end points (such as intersections) corresponding to the respective links or segments of the road segment data records 503. The road segment or link data records 503 and the node data records 501 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, road surface type, road surface condition, functional class, curvature, degree of traffic, number and types of accidents that have occurred, a number of road objects (e.g., road markings, road signs, traffic light posts, etc.), types of road objects, traffic directions, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 505. The database 125 can also include data about places, such as cities, towns, or other communities, and other geographic features, such as bodies of water, mountain ranges, etc. Such place or feature data can be part of the POI data records 505 or can be associated with POIs or POI data records 505 (such as a data point used for displaying or representing a position of a city).

The training data records 507 include training data for training a machine learning model to output a subset of target routes for a target vehicle using a spare tire. The training data include attributes of vehicles that used spare tires to traverse routes and attributes of the routes. In one embodiment, the attributes of the vehicles indicate: (1) vehicle specifications; (2) an amount of load exerted on each of the vehicles; (3) a weight distribution of each of the vehicles; (4) specifications of spare tires and non-spare tires; (5) a number of spare tires used by each of the vehicles; (6) one or more positions of one or more of the spare tires used by each of the vehicles; (7) tire pressure levels; (8) tire temperature levels; or (9) a combination thereof. The attributes of the routes indicate, for each road segment or node of each of the routes: (1) a road surface type; (2) a road surface condition; (3) a functional class; (4) a curvature; (5) a degree of traffic; (6) one or more traffic rules; (7) a weather condition impacting said road segment or node; or (8) a combination thereof.

Other data records 509 may include algorithms defining the machine learning model to output a subset of target routes for a target vehicle using a spare tire. The other data records 509 may further include data that are not included in the training data, but can be used for acquiring specifics of certain attributes of vehicles, such as attributes associated with vehicle tires, wheels, spare tires, etc.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing routes for vehicles using spare tires may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 6:
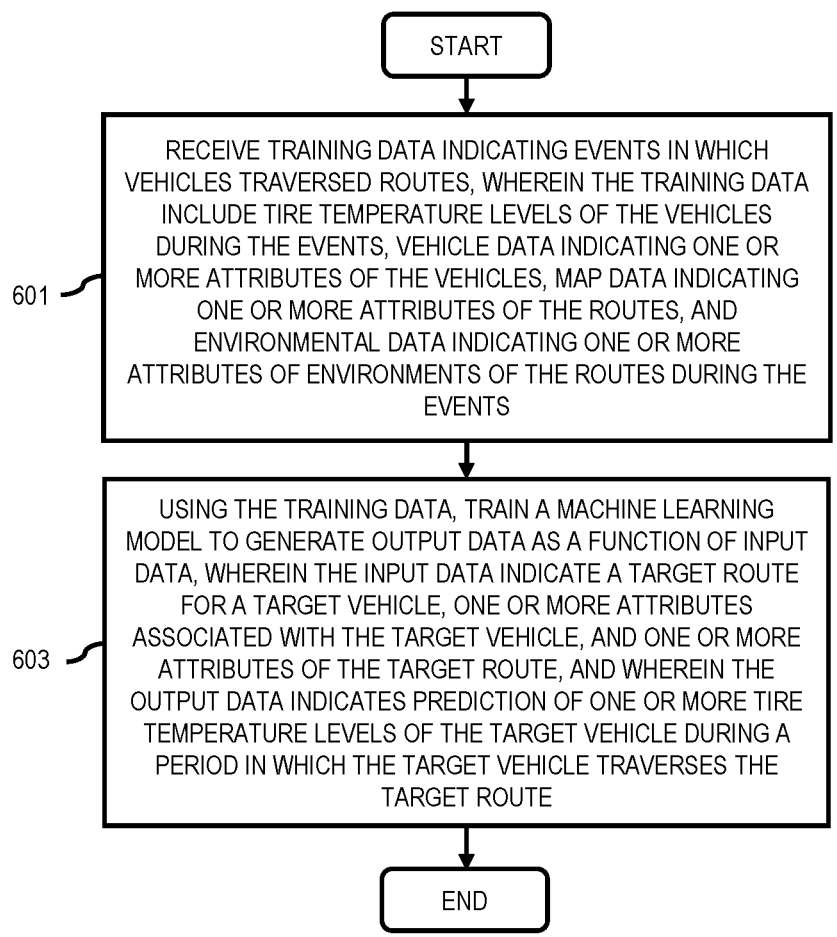
FIG. 6 illustrates a flowchart of a process for training a machine learning model to provide routes for vehicles using spare tires.
Figure 9:
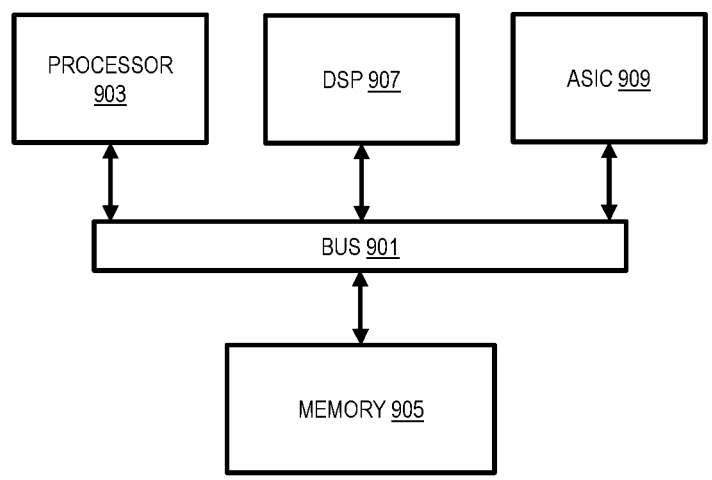
FIG. 9 illustrates a chip set or chip upon which an embodiment may be implemented.

FIG. 6 is a flowchart of a process 600 for training a machine learning model to provide routes for vehicles using spare tires, according to one embodiment. In one embodiment, the assessment platform 123 performs the process 600 and is implemented in, for instance, a chip set including a processor and a memory as shown in FIG. 9.

In step 601, the assessment platform 123 receives training data indicating events in which vehicles traversed routes. The training data indicating attributes of the vehicles and attributes of the routes. The attributes of the vehicles indicate: (1) vehicle specifications; (2) an amount of load exerted on each of the vehicles; (3) a weight distribution of each of the vehicles; (4) specifications of spare tires and non-spare tires; (5) a number of spare tires used by each of the vehicles; (6) one or more positions of one or more of the spare tires used by each of the vehicles; (7) tire pressure levels; (8) tire temperature levels; or (9) a combination thereof. The attributes of the routes indicate, for each road segment or node of each of the routes: (1) a road surface type; (2) a road surface condition; (3) a functional class; (4) a curvature; (5) a degree of traffic; (6) one or more traffic rules; (7) a weather condition impacting said road segment or node; or (8) a combination thereof.

In step 603, the assessment platform 123 uses the training data to train a machine learning model to generate output data as a function of input data. The input data indicate attributes of a target vehicle using at least one spare tire and attributes of target routes for the target vehicle, and the output data indicate a subset of the target routes of which the target vehicle can successfully traverse while using the at least one spare tire. The machine learning model receives the training data and transforms the training data into machine-readable and generalizable vectors. The machine learning model renders context around the training data such that commonalities can be detected. Once the machine learning model translates the training data into a vector format suitable to be used as a feature vector for machine learning, the assessment platform 123 trains the machine learning model on resulting pairs (i.e., observations as seen in the training data and desired output value). For example, a desired output value may be defined by a subset of routes for a vehicle using a spare tire for a given instances of time, and observations may be defined by aggregating all occurrences of past events in which vehicles used spare tires were recorded on a particular road segment during a particular setting (e.g., all occurrences having the same vector representation). In one embodiment, the machine learning model may incorporate supervised machine learning techniques. In one embodiment, the machine learning model may incorporate a standard regression or classification task.

FIG. 7 is a flowchart of a process 700 for providing routes for vehicles using spare tires, according to one embodiment. In one embodiment, the assessment platform 123 performs the process 700 and is implemented in, for instance, a chip set including a processor and a memory as shown in FIG. 9.

In step 701, the assessment platform 123 receives input data indicating attributes of the target vehicle and attributes of target routes for the target vehicle. The attributes of the target vehicle indicate: (1) vehicle specifications; (2) an amount of load exerted on the target vehicle; (3) a weight distribution of the target vehicle; (4) specifications of spare tires and non-spare tires; (5) a number of spare tires used by the target vehicle; (6) one or more positions of one or more of the spare tires used by the target vehicle; (7) tire pressure levels; (8) tire temperature levels; or (9) a combination thereof. The one or more attributes of the routes indicates, for each road segment or node of each of the routes: (1) a road surface type; (2) a road surface condition; (3) a functional class; (4) a curvature; (5) a degree of traffic; (6) one or more traffic rules; (7) a weather condition impacting said road segment or node; or (8) a combination thereof.

In step 703, the assessment platform 123 causes a machine learning model to generate output data as a function of the input data. The output data indicate a subset of the target routes of which the target vehicle can successfully traverse while using the at least one spare tire. The machine learning model is trained to generate the output data as a function of the input data based on training data. The training data indicate events in which vehicles used spare tires to traverse routes, the training data indicating attributes of the vehicles and attributes of the routes.

The system, apparatus, and methods described herein reliably provide potential routes for a vehicle using a spare tire based on attributes of the vehicle and the routes, thereby ensuring that the vehicle is likely to successfully traverse a selected route from the potential routes and providing assurance to the user of the vehicle. Additionally, the system, apparatus, and methods provide assistance for the vehicle to successfully traverse the selected route by providing features such as lane-level guidance, recommended speed limit, etc.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
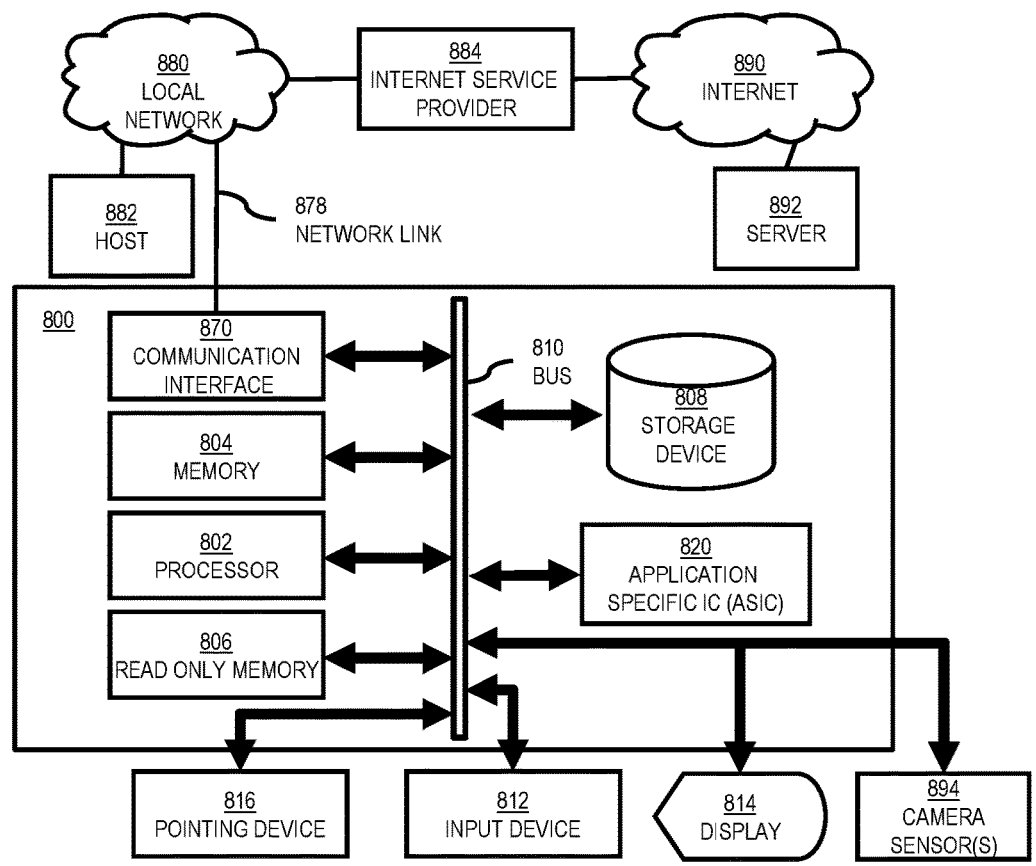
FIG. 8 illustrates a computer system upon which an embodiment may be implemented.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide routes for vehicles using spare tires as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing routes for vehicles using spare tires.

A bus 810 includes one or more parallel conductors of information so that information is transferred quickly among devices coupled to the bus 810. One or more processors 802 for processing information is coupled with the bus 810.

A processor (or multiple processors) 802 performs a set of operations on information as specified by computer program code related to providing routes for vehicles using spare tires. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing routes for vehicles using spare tires. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing routes for vehicles using spare tires, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 121 for providing routes for vehicles using spare tires to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 882 connected to the Internet hosts a process that provides a service in response to information received over the Internet. For example, server host 882 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 882 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide routes for vehicles using spare tires as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing routes for vehicles using spare tires.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real-time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors. The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide routes for vehicles using spare tires. The memory 905 also stores the data associated with or generated by the execution of the inventive steps.

Figure 10:
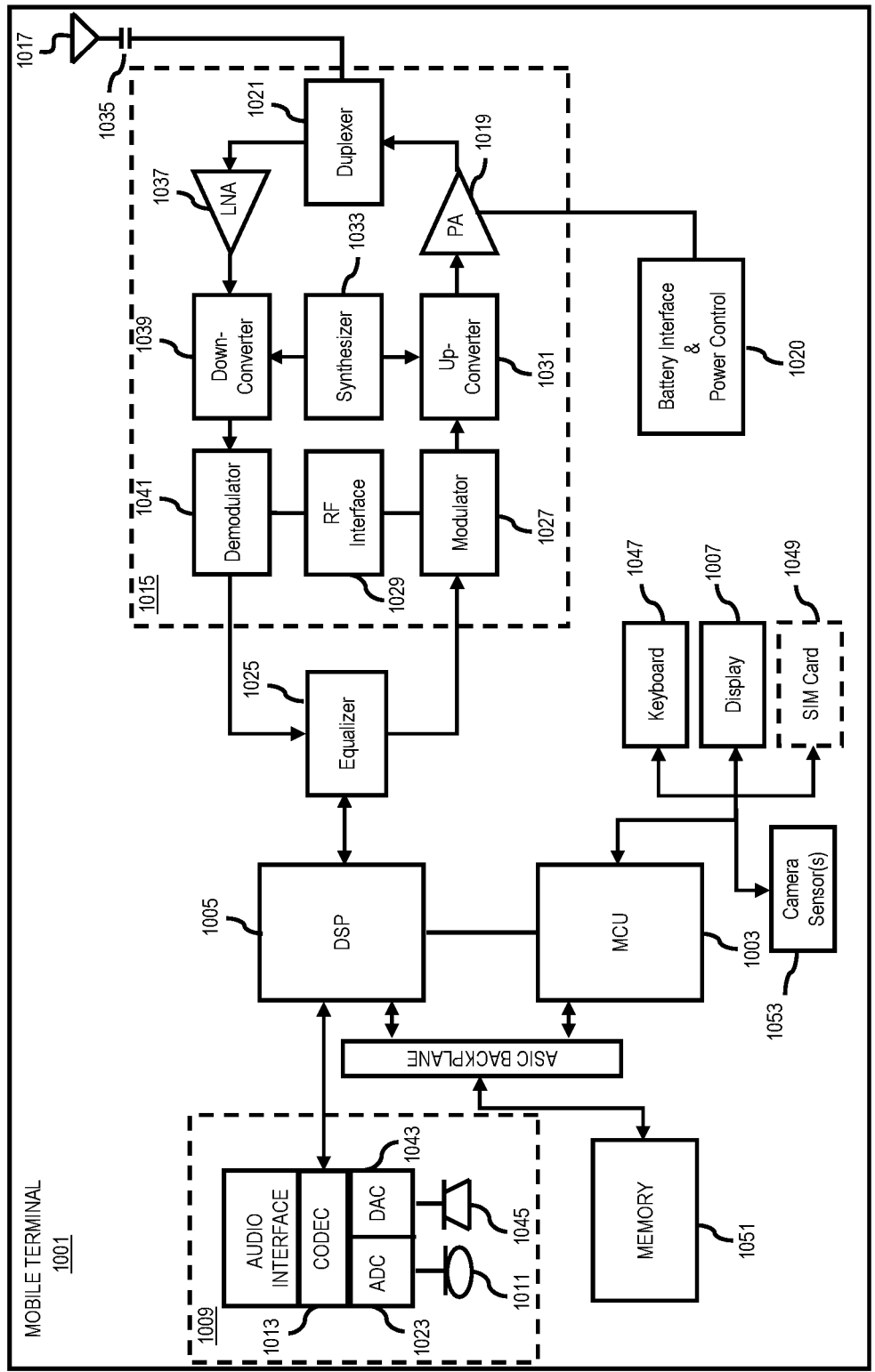
FIG. 10 illustrates a diagram of exemplary components of a mobile terminal for communications, which is capable of operating in the system of FIG. 1.

FIG. 10 is a diagram of exemplary components of a mobile terminal 1001 (e.g., a mobile device or vehicle or part thereof) for communications, which is capable of operating in the system of FIG. 1, according to one embodiment. In some embodiments, mobile terminal 1001, or a portion thereof, constitutes a means for performing one or more steps of providing routes for vehicles using spare tires. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing routes for vehicles using spare tires. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide routes for vehicles using spare tires. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
    receive training data indicating events in which vehicles used spare tires to traverse routes, the training data indicating attributes of the vehicles and attributes of the routes; and
    using the training data, train a machine learning model to generate output data as a function of input data, wherein the input data indicate attributes of a target vehicle using at least one spare tire and attributes of target routes for the target vehicle, and wherein the output data indicate a subset of the target routes of which the target vehicle can successfully traverse while using the at least one spare tire;
    receive the input data;
    cause the machine learning model to generate the output data as a function of the input data; and
    cause a user interface associated with the target vehicle to provide the subset to a user of the target vehicle.

2. The apparatus of claim 1, wherein the attributes of the vehicles indicate: (i) vehicle specifications; (ii) an amount of load exerted on each of the vehicles; (iii) a weight distribution of each of the vehicles; (iv) specifications of spare tires and non-spare tires; (v) a number of spare tires used by each of the vehicles; (vi) one or more positions of one or more of the spare tires used by each of the vehicles; (vii) tire pressure levels; (viii) tire temperature levels; or (ix) a combination thereof.

3. The apparatus of claim 1, wherein the attributes of the routes indicate, for each road segment or node of each of the routes: (i) a road surface type; (ii) a road surface condition; (iii) a functional class; (iv) a curvature; (v) a degree of traffic; (vi) a weather condition impacting said road segment or node; (vii) one or more traffic rules; or (viii) a combination thereof.

4. The apparatus of claim 1, wherein the training data include maneuver data indicating maneuvers executed by the vehicles during the events, and wherein the output data indicate vehicle maneuver instructions for maneuvering the target vehicle on each of the subset.

5. The apparatus of claim 1, wherein the computer program code instructions configured to, when executed, cause the apparatus to:
    receive a selection of one of the subset;
    based on a location of the target vehicle and one or more attributes of the one of the subset, generate a maneuver instruction for traversing the one of the subset; and
    cause the user interface to provide the maneuver instruction.

6. The apparatus of claim 1, wherein the computer program code instructions configured to, when executed, cause the apparatus to:
    cause the target vehicle to broadcast installation of the at least one spare tire to one or more other vehicles.

7. A non-transitory computer-readable storage medium having computer program code instructions stored therein, the computer program code instructions, when executed by at least one processor, cause the at least one processor to:
receive input data indicating attributes of a target vehicle using at least one spare tire and attributes of target routes for the target vehicle;
cause a machine learning model to generate output data as a function of the input data,
wherein the output data indicate a subset of the target routes of which the target vehicle can successfully traverse while using the at least one spare tire,
wherein the machine learning model is trained to generate the output data as a function of the input data based on training data, and
wherein the training data indicate events in which vehicles used spare tires to traverse routes, the training data indicating attributes of the vehicles and attributes of the routes; and
cause a user interface associated with the target vehicle to provide the subset to a user of the target vehicle.

8. The non-transitory computer-readable storage medium of claim 7, wherein the computer program code instructions, when executed by the at least one processor, cause the at least one processor to determine the target routes based on locations of points-of-interest designated for providing vehicle-related services.

9. The non-transitory computer-readable storage medium of claim 7, wherein the input data is first input, wherein the output data is first output data, wherein the subset is a first subset, and wherein the computer program code instructions, when executed by the at least one processor, cause the at least one processor to:
alter one or more of the attributes of the target vehicle;
cause the machine learning model to generate second output data as a function of second input data, the second input data indicating the one or more altered attributes of the target vehicle,
wherein the second output data indicate a second subset of the target routes of which the target vehicle can successfully traverse while using the at least one spare tire; and
generate a recommendation to be provided at the user interface, wherein the recommendation indicate the one or more altered attributes of the target vehicle and the second subset.

10. The non-transitory computer-readable storage medium of claim 9, wherein the one or more altered attributes include: (i) an amount of load exerted on the target vehicle; (iii) a weight distribution of the target vehicle; (iv) a number of spare tires used by the target vehicle; (v) one or more positions of one or more of the spare tires used by the target vehicle; (vii) one or more tire pressure levels of one or more tires of the target vehicle; or (viii) a combination thereof.

11. The non-transitory computer-readable storage medium of claim 7, wherein the input data is first input, wherein the output data is first output data, wherein the subset is a first subset, wherein one or more of the attributes of the target routes indicates conditions of the target routes at one or more first time instances, and wherein the computer program code instructions, when executed by the at least one processor, cause the at least one processor to:
receive prediction data indicating predicted changes in the one or more of the attributes of the target routes;
based on the prediction data, alter the one or more of the attributes of the target routes to indicate the conditions of the target routes at one or more second time instances following the one or more first time instances;
cause the machine learning model to generate second output data as a function of second input data, the second input data indicating the one or more altered attributes of the target vehicle,
wherein the second output data indicate a second subset of the target routes of which the target vehicle can successfully traverse while using the at least one spare tire;
calculate one or more departure times for the target vehicle to begin traversing each of the subset based on the one or more second time instances; and
generate a recommendation to be provided at the user interface, wherein the recommendation indicate the one or more departure times.

12. The non-transitory computer-readable storage medium of claim 11, wherein the prediction data are weather forecast data, and wherein the one or more of the attributes of the target routes is weather conditions of the target routes.

13. The non-transitory computer-readable storage medium of claim 7, wherein the attributes of the vehicles indicate: (i) vehicle specifications; (ii) an amount of load exerted on each of the vehicles; (iii) a weight distribution of each of the vehicles; (iv) specifications of spare tires and non-spare tires; (v) a number of spare tires used by each of the vehicles; (vi) one or more positions of one or more of the spare tires used by each of the vehicles; (vii) tire pressure levels; (viii) tire temperature levels; or (ix) a combination thereof.

14. The non-transitory computer-readable storage medium of claim 7, wherein the attributes of the routes indicate, for each road segment or node of each of the routes: (i) a road surface type; (ii) a road surface condition; (iii) a functional class; (iv) a curvature; (v) a degree of traffic; (vi) a weather condition impacting said road segment or node; (vii) one or more traffic rules; or (viii) a combination thereof.

15. The non-transitory computer-readable storage medium of claim 7, wherein the training data include maneuver data indicating maneuvers executed by the vehicles during the events, and wherein the output data indicate vehicle maneuver instructions for maneuvering the target vehicle on each of the subset.

16. A method of providing route recommendations for a target vehicle using at least one spare tire, the method comprising:
receiving input data indicating attributes of the target vehicle and attributes of target routes for the target vehicle;
causing a machine learning model to generate output data as a function of the input data,
wherein the output data indicate a subset of the target routes of which the target vehicle can successfully traverse while using the at least one spare tire,
wherein the machine learning model is trained to generate the output data as a function of the input data based on training data, and
wherein the training data indicate events in which vehicles used spare tires to traverse routes, the training data indicating attributes of the vehicles and attributes of the routes; and
causing a user interface associated with the target vehicle to provide the subset to a user of the target vehicle.

17. The method of claim 16, further comprising determining the target routes based on locations of points-of-interest designated for providing vehicle-related services.

18. The method of claim 16, wherein the attributes of the vehicles indicate: (i) vehicle specifications; (ii) an amount of load exerted on each of the vehicles; (iii) a weight distribution of each of the vehicles; (iv) specifications of spare tires and non-spare tires; (v) a number of spare tires used by each of the vehicles; (vi) one or more positions of one or more of the spare tires used by each of the vehicles; (vii) tire pressure levels; (viii) tire temperature levels; or (ix) a combination thereof.

19. The method of claim 16, wherein the attributes of the routes indicate, for each road segment or node of each of the routes: (i) a road surface type; (ii) a road surface condition; (iii) a functional class; (iv) a curvature; (v) a degree of traffic; (vi) a weather condition impacting said road segment or node; (vii) one or more traffic rules; or (viii) a combination thereof.

20. The method of claim 16, wherein the training data include maneuver data indicating maneuvers executed by the vehicles during the events, and wherein the output data indicate vehicle maneuver instructions for maneuvering the target vehicle on each of the subset.

* * * * *